United States Patent [19]

D'Luzansky et al.

[11] Patent Number: 5,275,860
[45] Date of Patent: Jan. 4, 1994

[54] FOAM PRODUCT FOR RECREATIONAL PRODUCTS

[75] Inventors: John S. D'Luzansky, Mesa, Ariz.;
Anthony L. Panzica, Lexington, Ky.;
Steven B. Ruble, Lexington, Ky.;
Herman A. Smith, Lexington, Ky.

[73] Assignee: Foam Design Consumer Products, Inc., Lexington, Ky.

[21] Appl. No.: 890,441

[22] Filed: May 28, 1992

[51] Int. Cl.⁵ .................. B32B 3/26; B32B 27/00; B63B 35/79; B63B 5/24
[52] U.S. Cl. ........................ 428/71; 428/76; 428/304.4; 428/314.4; 428/314.8; 428/319.7; 428/319.9; 441/74; 114/357
[58] Field of Search ............. 428/71, 76, 314.4, 314.8, 428/319.7, 304.4, 319.9; 441/74; 114/357

[56] References Cited

U.S. PATENT DOCUMENTS 4,850,913 7/1989 Szabad, Jr. .................. 114/357

Primary Examiner—George F. Lesmes
Assistant Examiner—Kathryne Elaine Shelborne
Attorney, Agent, or Firm—Beehler & Pavitt

[57] ABSTRACT

The present invention relates to surf boards and bodyboards and the like used for water sports and wherein the board includes a core foam which is a closed pore or closed cell foam to which is directly bonded an upper and lower skin. To achieve a substantially high integrity bond, an intermediate layer is used composed of a mixture of the polymeric material of the foam and the different polymeric material of the skins. The foam may be polypropylene expanded bead foam while the skins may be of high density polyethylene. Procedures are also disclosed for forming such products as well as procedures for providing rocker, an important characteristic of such boards.

8 Claims, 1 Drawing Sheet

FOAM PRODUCT FOR RECREATIONAL PRODUCTS

FIELD OF INVENTION

The present invention relates to an improved foam product and more particularly to an improved laminated foam containing buoyant recreational product such as a bodyboard or surf board for use in water sports in which a foam core has firmly anchored to it a top and bottom skin layer.

BACKGROUND OF THE INVENTION

Bodyboards and surf board as well as other buoyant boards used in water sports are normally composed of a laminated structure in which a center core has joined to it a top deck skin and a bottom skin. The sides of the boards may include a rail and a chine. Typically, the thickness of the board is about 2½ inches in the major area of the board. As is well known in the case of bodyboards, there are a variety of configurations such as a tail configuration and the nose configuration. Flutes may be provided in the bottom surface of the board.

In general, bodyboards may include a variable flexure characteristic, e.g., needed flexure in the nose area for what is known as "power turns" and strength in the mid and tail sections which may be required for speed. The nose section may be configured to permit corner flexing or flexing along the entire nose section. In general, the bottom skin is smooth, tough and scratch resistant for speed over the water. The deck skin or upper surface of the board is textured to provide relative slip resistance. It is also generally true that lighter weight in a board is desired since a lighter weight board will displace less water resulting in increased speed, the latter a desirable characteristic. It is also the case that strength and resistance to delamination are required. The salt water environment in which these boards are generally used and the sometimes severe maneuvers which are accomplished on the board require that the board be Well Constructed to last for a reasonable period of desired use and reliable performance.

In addition to the above, there is a characteristic of a bodyboard known as "rocker". This generally refers to the bending up from the centerline of the bodyboard. There is overall rocker, nose rocker and tail rocker. Rocker usually affects the ability of the board to plane above the uneven surface of the water. It also affects the speed of the board, the ability to do "360's" (spinning the board like a top), and other control characteristics of a board. There is no "perfect" rocker but there is general agreement on what constitutes a good rocker. Typically good rocker involves a gentle curve upward from about ⅓ back from the nose with a resulting rise from the bottom of the board to about 1½ inches at the nose. The other ⅔ of the board should be flat or have a very small amount of rise from about ⅓ back from the nose.

In recent years, the use of closed pore polypropylene foam as a core material for bodyboards has become increasingly popular. One of the problems in using polypropylene foam as a core is the difficulty in joining other components to the core. In large part the difficulty stems from the desire to laminate to the core a polymer that is different from polypropylene in order to obtain specific characteristics in the finished board product. Typically, the polymer joined to the polypropylene core is a material such as polyethylene in a closed pore thin foam textured layer as the top or deck skin while a film (non-porous and smooth) of polyethylene is used as the bottom skin. The bottom skin should preferably offer crease resistance since in use the board is sometimes flexed along the long axis of the board. Overall, it is desirable to permit the bodyboard to deflect and to return its energy quickly, i.e., a spring action.

It has been the practice in using polypropylene foam as the core to use a liquid glue or adhesive to join other components to the core material. The difficulty with such a procedure is that chemical vapors are released into the air as the solvent for the adhesive evaporates during the manufacturing process. Another problem is that the use of adhesive may add considerable weight to the board where the objective is to provide a relatively low weight for better board performance. Still another objection is the action of salt water on the adhesive joint with possible delamination in local areas or along a section of the board.

Another prior art procedure for joining other materials to the polypropylene foam core is to use a heat lamination process. To understand the problems associated with this prior art process, it is helpful to understand better the nature of the polypropylene foam. Polypropylene foam is usually made by one of two processes, one called a resilient molded bead process and the other an extruded bead process. In the extruded bead process, the polypropylene resin starts in the form of solid pellets. They are then melted and mixed with other chemicals. The molten mixture is then extruded, usually in the form of a sheet. The sheet is then foamed either by activating chemical in the material or by gaseous injection. The extruded foam is comprised of closed cells. The resilient molded bead process is also known as steam chest molding in which the beads are placed in a mold and expanded through the use of steam and pressure.

For example, if one examines a direct heat laminated combination of a polypropylene closed cell foam and a sheet of polyethylene film, several deficiencies become apparent. One such condition is what is known as "foam tear", a term used to describe a joint which is stronger than one or both of the materials joined together. The objective is to achieve foam tear i.e. parting of one or more of the laminated materials rather than separation at the bond line. This is sometimes referred to as peel strength, i.e., the strength of the bond is greater than the tear strength of the materials laminated together, in other words, if one attempts to pull the heat laminated materials apart, the foam layer will tear rather than permitting delamination along the bond line. For practical reasons, polyethylene and polypropylene do not heat laminate together well enough to achieve foam tear.

Another deficiency is that the prior art practices have resulted in "puckering" or shrinking of the layer, rather than a smooth even surface. This results in a considerable amount of scrap and inferior bonding. While it is possible to heat laminate polyethylene and a polypropylene foam material together, extremely close temperature control is necessary if one is to achieve foam tear. For example, polyethylene may be heat laminated to polyethylene at about 229 degrees F., polypropylene may be heat laminated to polypropylene at about 290 degrees F., achieving foam tear in each case. However, in heat laminating polyethylene to polypropylene foam, temperatures as high as and in excess of 500 degrees F. have been used with the result of considerable shrinking and without achieving foam tear. It is apparent that it is not the temperature used in heat lamination which is the sole cause of the problem; it seems to be related to the polymeric differences. Even the addition of chemicals to the host polymer to change the melting points did not seem to solve the heat lamination problem.

It is accordingly apparent that a need exists for an improved laminated buoyant foam structure in which the laminated parts are firmly and adequately bonded together, especially if the materials to be bonded are of different polymeric materials or of different foam characteristics.

It is also apparent that in the case of foam products use in water sports, for example, bodyboards and surf boards and the like, that a need exists for a laminated product which has strength, flexibility and return of energy as desired, and which will not delaminate over the useful and normal life of the product.

It is also apparent that a need exists for a more reliable and less expensive procedure for the commercial manufacture of foam products for use in water sports, for example, bodyboards and surf boards and the like which results in simplified and more effective and less expensive procedures for the commercial manufacture of such products Equally apparent is that a need exists for a simplified construction of buoyant foam products for use in water sports, for example, bodyboards and surf boards and the like, in which the resulting product provides the desired strength and flexibility and in which the layers of material bonded to the foam core are securely anchored to prevent delamination.

Moreover, it is apparent that a need exists for an improved foam product for use in water sports in which a top and bottom skin is joined to the foam core and in which the peel strength of the bond between the top layer and the foam and between the bottom layer and the foam is greater than the tear strength of the top and bottom layers and the foam.

BRIEF DESCRIPTION OF THE INVENTION

The buoyant laminated foam core product of this invention represents marked improvement over prior art comparable products, such as surf boards and bodyboards, by substantially improving the bond between the core foam section and the top and bottom skins as the result of an improved heat bonding procedure which results in overall improvement of the resulting product.

By this invention a polypropylene closed pore or closed cell foam is used together with intermediate bond layers which are heat laminated to each surface of the core. The intermediate bond layers are mixtures of the polymer material of the core and the polymer material of the top skin and the lower skin, the latter usually polyethylene. The result is a lightweight, relatively strong board structure in which the peel strength at the bond lines is normally greater than the tear strength of the core and the top and bottom skins. The intermediate layers may be of the same or different mixtures of polymers depending upon which polymers are used for the core and the top and bottom skins.

It will be apparent from the following detailed description, to be considered as illustrative of this invention, that variations may be made and that the following description and drawings are to be deemed as illustrative as opposed to being limitations on the present invention.

DETAILED DESCRIPTION OF THE INVENTION

Figure 1:
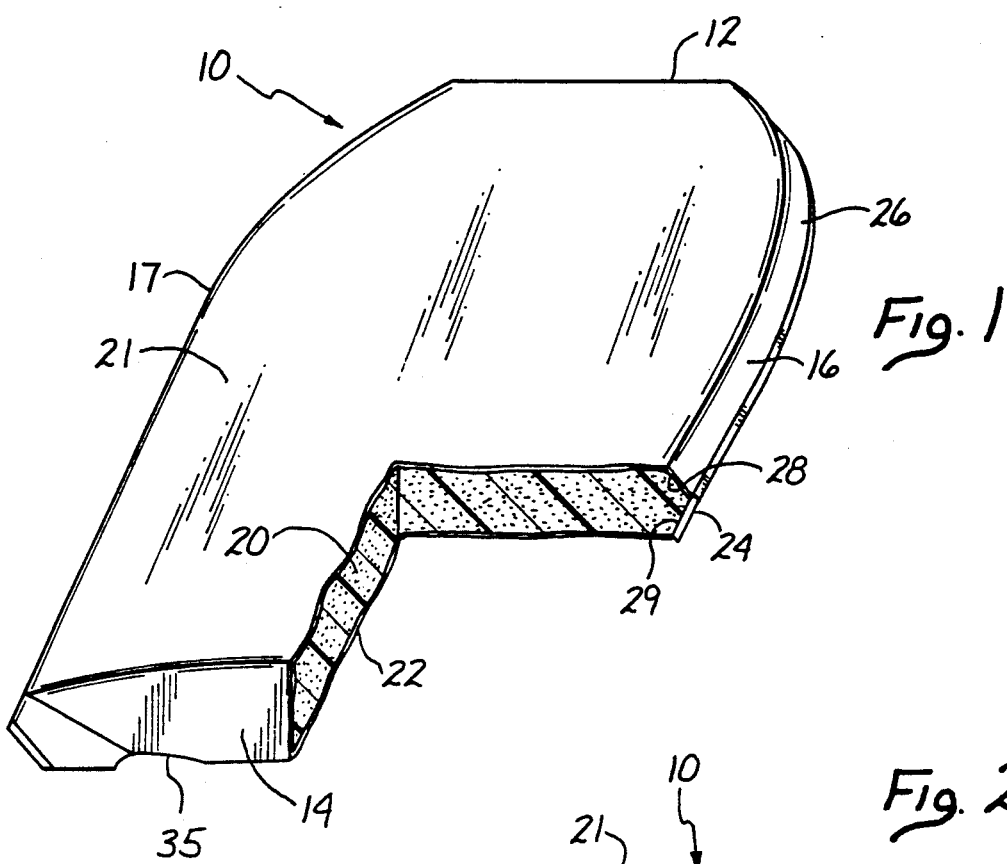
FIG. 1 is a view partly in section and partly in elevation of a bodyboard made in accordance with this invention.

Referring to the drawings which illustrate preferred forms of the present invention, FIGURE illustrates a bodyboard 10 made in accordance with this invention. While reference to a bodyboard will be made in explaining the present invention, it is to be understood that the present invention is not limited thereto and may be used with other and related products, especially those used in water sports. Further, the present invention is not limited to the particular configuration of bodyboard shown and may be of any configuration, as is well known in the art.

The board 10 includes a nose section 12 and a tail section 14 with side sections 16 and 17 extending between the tail 14 and the nose 12. As shown, the side sections are in generally spaced parallel relation, save for the front portion thereof which curves to meet the nose, as shown. The spacing between the side sections may also be narrower at the tail end of the board as compared to the spacing about ⅓ back from the nose of the board. The front end of the nose is generally flat and non-curved. The board also includes a foam core center section 20 with a top skin 21 and a bottom skin 22 bonded to the core, as will be described. The foam core is a closed pore or closed cell foam of a plastic material, preferably polypropylene which is the resilient molded bead type or the extruded type, as already described. The density of the foam may vary widely, but is preferably between 1.2 pounds per cubic foot and 2.5 pounds per cubic foot, and normally around 1.8 pounds per cubic foot for lightness, strength and safety. A typical such material is that available under the trademark "Dynalite".

The top skin 21 sometimes also referred to as the top deck is preferably made of high density polyethylene, the outer or top exposed surface being textured for slip resistance. It may, for example be a closed pore high strength film-like foam the foam character providing the textured characteristic. Other polymeric materials with texturing obtained by different means may also be used. In contrast, the bottom skin 22 has an outer slick surface for low frictional travel over water and is preferably a radiation cross-linked non-foamed polyethylene polymer bonded to a solid polyethylene film. The bottom skin may be of a thickness of varying thickness, but usually preferably between 12 to 35 mils and is usually around 25 mils for strength, and light weight. The use of high density polyethylene for the top deck and bottom skin is preferred for strength, low coefficient of friction and abrasion resistance.

The sides 16 and 17 are preferably formed of a lower rail section 24 and a chine 26, each of polyethylene plastic foam material, sometimes having solid films bonded to them, and all joined to the side edges of the foam core 20, as will be described. As shown, the side edges 28 and 29 of the foam core are angled for easy gripping and manipulation of the board during use. In general, the top deck of the board is flat while the bottom thereof may be slightly curved, as will be described. Also illustrated is a channel 35 on the bottom, spaced inwardly from each of the sides of the board.

Figure 2:
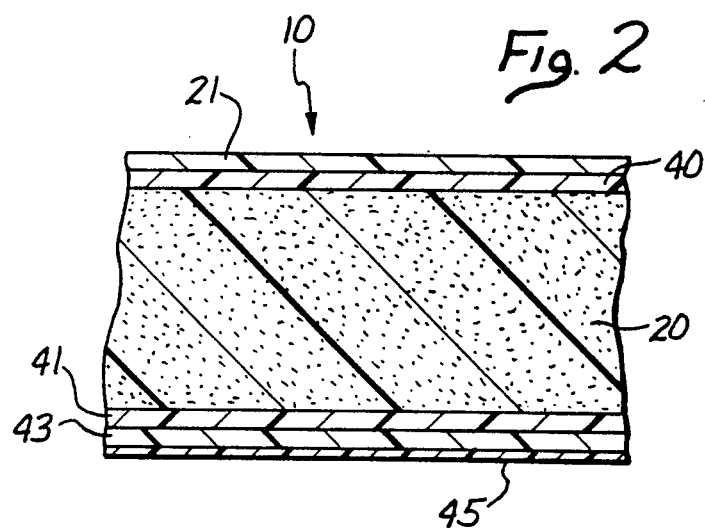
FIG. 2 is a sectional view illustrating the improved buoyant bodyboard in accordance with this invention.

Referring now to FIG. 2, the board 10 is a laminated product composed of the closed cell polypropylene molded bead foam core 20 previously described. Essentially uniformly distributed throughout the foam core 20 are a multiplicity of relatively large closed foam shells having an outer skin and interior smaller closed cells, diagrammatically shown in FIG. 1. These foam shells are also present along all of the outer surfaces of the foam core. The top deck or top skin 21 overlies the foam core and is spaced therefrom by an intermediate transition layer 40. This intermediate transition layer is effectively a mixture of the polymeric material of the foam core and the polymeric material of the top skin. In this example the intermediate layer is a mixture of 65% polypropylene and 35% polyethylene, by weight, the core being polypropylene and the top skin being polyethylene preferably having a textured outer top surface as already described. A typical material useable as the intermediate layer is that available under the trademark "VOLARA LM", available as a foam material from Voltek, a division of Sekisui America.

The bottom of the board 10, i.e., the water contacting surface, also includes an intermediate layer 41 similar to layer 40 already described. This layer is bonded to the bottom surface of the foam core 20. Bonded to the lower intermediate layer 41 is a layer of irradiated cross-linked polyethylene foam 43 to which is bonded a high density polyethylene film 45. Film 45 is preferably used to provide a low friction surface for fast skimming action of the board over water.

The function of the intermediate layers is to form a strong bond with the different polymeric materials on each surface of the layer, i.e., between the polypropylene foam core 20 and the polyethylene top deck 21 and between the polypropylene foam core 22 and the polyethylene lower skin 41. Layers 43 and 45 may be purchased as preassembled layers, previously bonded by a spray coating process. It ought to be recognized that bonding as used herein refers to heat bonding of the layers, a process normally used in the manufacture of bodyboards and the like.

To understand better the advantages of this invention it is worthwhile to understand the general manufacturing process of products to which the present invention relates. Typically a board manufacturer purchases the component parts from outside vendors, e.g., films and formed foam products, and the like. Normally, the foam core is cut or shaped to size, then the top deck and bottom skin are laminated to the foam core. Thereafter, the rail and chine are joined to the bodyboard subassembly. Prior to the use of polypropylene foam cores already described, a heat lamination procedure was used in which the top surface of the foam core was heated as was the mating surface of the top deck, normally using hot air or other heat source. The top deck was assembled over the top surface of the core and the subassembly passed through the nip of pressure rollers to heat laminate the two components together. Where the polymeric materials were essentially of the same character, the temperature and pressure and time used for the lamination process was relatively easily controllable to provide an adequate bond. Thereafter the lower skin(s) were also heat laminated to the core, followed by hand joining the rail and chine to the sides of the core, again by a heat lamination process using a heat gun or the like. Since this presented no major problems due to the "likeness" of the polymeric materials being used, normally no major problems were encountered.

However, with the advent of the use of different polymeric materials, especially polypropylene foams as already described, the different responses of the different polymeric materials to applied heat created bonding problems, as described. In effect, the new material required closer control of temperature, pressure and time of the heat lamination process. If not closely and adequately controlled, the result was inadequate bonding and the high scrap rates already mentioned. To avoid this problem, adhesive joints were used to bond to all surfaces of the core.

One of the primary advantages of this invention is the ability of the board manufacturer to use basically the same heat lamination process previously used, as well as basically the same equipment already in place, to produce an improved board product having unusually high relative bond strength along the bond lines between the foam core and the layers heat bonded thereto. This relatively high level of bond strength achieved in accordance with this invention may be manifest by a simple peel test. If one laminates a polypropylene foam core to a polyethylene material using the intermediate transition layer, as described herein, the part line is usually in the foam core adjacent to the intermediate layer rather than the bond line at the interface between the intermediate layer and the polyethylene or the intermediate layer and the foam core. If the same materials are heat bonded together, without an adhesive, the part line is between the foam core and the polyethylene layer, indicating that the peel strength is less than the tear strength of the materials heat bonded together.

By the present invention several advantages are obtained in terms of manufacturing process and board structure. For example, the use of the intermediate layer permits the temperature of the lamination process to be lower and of a broader permissible range. The result is reduced defective laminations due to temperature variations in the lamination process. In effect, machine controls do not have to be as accurate as they would have to be without the use of the intermediate layer. Machine operator error in setting heat controls is more easily tolerated and production rates of acceptable products may be increased.

In addition, since the temperature is wide and broader, this allows the use of lower melting point, thinner and less dense materials leading to reduction in board weight. Since the pressure used in the lamination process using the intermediate layer is less than without the use of this layer, there is less distortion of the resulting product and dimensional stability of the overall product is easier to control It is known for example that the lamination pressure has a correlation to the amount of rocker as the board cools. The greater the pressure the more the board tends to curl toward the heated side of the board. It is desirable that portions of the board be flat.

For example, to achieve foam tear in each of the following examples, the intermediate layer may be heat laminated to the same intermediate layer at about 290 degrees F. The intermediate layer may be heat bonded to a polypropylene closed pore foam material at about 290 degrees F. The polyethylene material may be heat bonded to the intermediate layer at about 354 degrees F. In each case this is a far lower temperature than was needed to heat laminate polyethylene to a polypropylene foam. Due to the ability to use a lower temperature range for both heat laminations, it is not necessary to reach the higher temperatures needed for direct lamination of polyethylene to polypropylene. However, there is a 60 degree spread which is easily controllable so as not to overheat the other portion of the composite laminate.

In general, the procedure which may be used to produce the improved product of this invention involves heat laminating an intermediate layer, as described, to the top surface of the pre-shaped and cut foam core and thereafter heat laminating an intermediate layer to the bottom surface of the foam core. Each of these lamination steps is usually conducted in a single pass through the pressure roll laminator. Then the bottom layer(s) are heat laminated in a pass through the heat laminator followed by heat laminating the top skin. Finally, the rail and chine are assembled, optionally through the use of an intermediate layer and by use of a heat gun. This final step is usually conducted manually.

Figure 3:
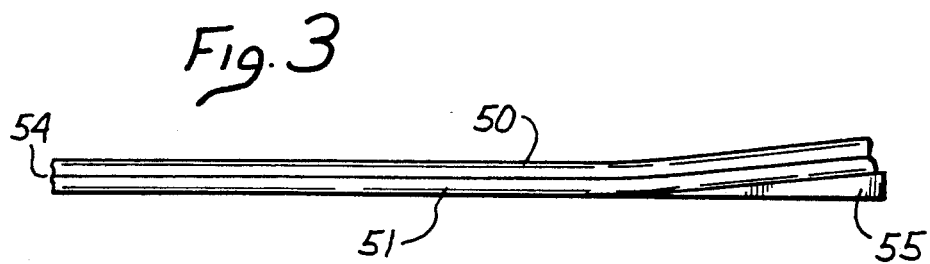
FIG. 3 is a sectional view of an improved methodology of providing the proper rocker in accordance with this invention.

As mentioned, rocker is an important attribute of bodyboards. Referring to FIG. 3, one may understand how rocker may be provided in accordance with this invention. More specifically, since adhesives are not needed for lamination of the top and bottom skins, one may form the core of two separate core elements 50 and 51, each of polypropylene closed cell foam, as described. These core elements may be glued together as at 54 while a lifting wedge 55 is placed under what is to become the front end of the bodyboard. After the glue or adhesive has set, the composite core has a permanent rocker built into it. Thereafter, the remaining components may be heat laminated to the board as already described. Optionally, the front end of the lower core element be trimmed that the upper core element lays flat and there is an angle in the bottom core at the front end, i.e., the front end of the lower core element is tapered.

It is also apparent that the top and bottom skins, rail and chine may be of materials of different colors, as is frequently the case in bodyboards. Moreover, the sides may be essentially flat as opposed to being angled. These and other variations will become apparent to those skilled in the art and are to be deemed to come within the scope of this invention as set forth in the appended claims.

What is claimed is:

1. An improved laminated closed cell foam product for use in water sports comprising:
    a buoyant closed cell foam core of polypropylene material having a predetermined thickness,
    an upper cover of polyethylene material having a thickness less than said predetermined thickness and being heat bonded to said closed cell foam core,
    a lower cover of polyethylene material having a thickness less than said predetermined thickness and being heat bonded to said closed cell foam core,
    a separate layer of intermediate polymeric material heat bonded to each of said upper cover and said foam core and said lower cover and said foam core, and
    said separate layer of intermediate polymeric material being a mixture of 65% polypropylene and 35% polyethylene, by weight, whereby a bond is formed which is of a peel strength greater than the tear strength of said foam core or said upper and lower covers.

2. An improved laminated closed cell foam product as set forth in claim 1 wherein said product is a bodyboard, plurality of closed foam shells distributed throughout said core including the top and bottom surfaces thereof.

3. An improved laminated closed cell foam product as set forth in claim 1 wherein said product is a bodyboard,
    said bodyboard including an essentially planar top surface.

4. An improved laminated closed cell foam product as set forth in claim 3 wherein said bodyboard includes a rocker configuration such that approximately the front ⅓ of the bottom of the board is angled upwardly.

5. An improved laminated closed cell foam product as set forth in claim 3 wherein the thickness of the board at its thickest point is not more than about 2½ inches in thickness.

6. An improved laminated closed cell foam product as set forth in claim 1 wherein the density of said foam core is between 1.2 and 2.5 pounds per cubic foot.

7. An improved laminated closed cell foam product as set forth in claim 6 wherein the density of said foam core is about 1.8 pounds per cubic foot.

8. An improved laminated closed cell foam product as set forth in claim 1 wherein the upper and lower covers are of a thickness of between 12 to 35 mils.

* * * * *